US011971296B2

United States Patent
Okuta et al.

(10) Patent No.: US 11,971,296 B2
(45) Date of Patent: Apr. 30, 2024

(54) MEASUREMENT SYSTEM AND MEASUREMENT METHOD

(71) Applicant: Kabushiki Kaisha Nihon Micronics, Tokyo (JP)

(72) Inventors: Michitaka Okuta, Tokyo (JP); Yuki Saito, Tokyo (JP); Hisao Narita, Aomori (JP); Shou Harako, Aomori (JP); Jukiya Fukushi, Aomori (JP); Tomokazu Saito, Aomori (JP); Toshinaga Takeya, Aomori (JP)

(73) Assignee: Kabushiki Kaisha Nihon Micronics, Musashino (JP)

( * ) Notice: Subject to any disclaimer, the term of this patent is extended or adjusted under 35 U.S.C. 154(b) by 0 days.

(21) Appl. No.: 17/392,216

(22) Filed: Aug. 2, 2021

(65) Prior Publication Data
US 2022/0034714 A1    Feb. 3, 2022

(30) Foreign Application Priority Data

Aug. 3, 2020 (JP) .................................. 2020-131884

(51) Int. Cl.
*G01J 1/42*    (2006.01)
*G01J 1/04*    (2006.01)

(52) U.S. Cl.
CPC .......... *G01J 1/4257* (2013.01); *G01J 1/0425* (2013.01)

(58) Field of Classification Search
CPC .............................. G01J 1/4257; G01J 1/0425
See application file for complete search history.

(56) References Cited

U.S. PATENT DOCUMENTS

| | | | |
|---|---|---|---|
| 9,316,532 B2* | 4/2016 | Mochizuki | G01J 1/0414 |
| 9,869,453 B2* | 1/2018 | Samonji | G03B 21/2013 |
| 10,120,177 B2* | 11/2018 | Okamoto | G02B 21/361 |
| 2006/0248619 A1* | 11/2006 | Fujita | B82Y 30/00 |
| | | | 75/427 |
| 2007/0097198 A1* | 5/2007 | Iwata | B41J 11/0021 |
| | | | 427/256 |
| 2008/0073518 A1 | 3/2008 | Itoh et al. | |
| 2009/0045317 A1* | 2/2009 | Fushman | G02B 6/4222 |
| | | | 385/27 |
| 2010/0176311 A1 | 7/2010 | Segi et al. | |
| 2013/0050691 A1 | 2/2013 | Jimbo et al. | |
| 2015/0043000 A1 | 2/2015 | Mochizuki | |
| 2021/0263070 A1* | 8/2021 | Janunts | G01J 1/0429 |

(Continued)

FOREIGN PATENT DOCUMENTS

| | | |
|---|---|---|
| CN | 1942753 A | 4/2007 |
| DE | 102018119096 B3 | 11/2019 |

(Continued)

*Primary Examiner* — Tarifur R Chowdhury
*Assistant Examiner* — Kemaya Nguyen
(74) *Attorney, Agent, or Firm* — Lorenz & Kopf, LLP

(57) ABSTRACT

A measurement method of receiving an emission light output from an optical semiconductor element on an incident end surface of an optical probe, shifts a relative position between the optical semiconductor element and the optical probe on a plane surface intersecting with an optical axis of the emission light, measures an incident intensity of the emission light at several positions, and obtains an incident intensity pattern showing a relationship between a change in the relative position and the respective incident intensities.

15 Claims, 11 Drawing Sheets

(56) References Cited

U.S. PATENT DOCUMENTS

2022/0018709 A1* 1/2022 Trampert .................. G01J 1/42
2022/0034959 A1   2/2022 Arai et al.

FOREIGN PATENT DOCUMENTS

| JP | S63224385 A    | 9/1988  |
| JP | H0968477 A     | 3/1997  |
| JP | 2005017106 A   | 1/2005  |
| JP | 2014134497 A   | 7/2014  |
| JP | 2020047889 A   | 3/2020  |
| KR | 20090123005 A  | 12/2009 |
| KR | 20130023065 A  | 3/2013  |
| WO | 2020059440 A1  | 3/2020  |

* cited by examiner

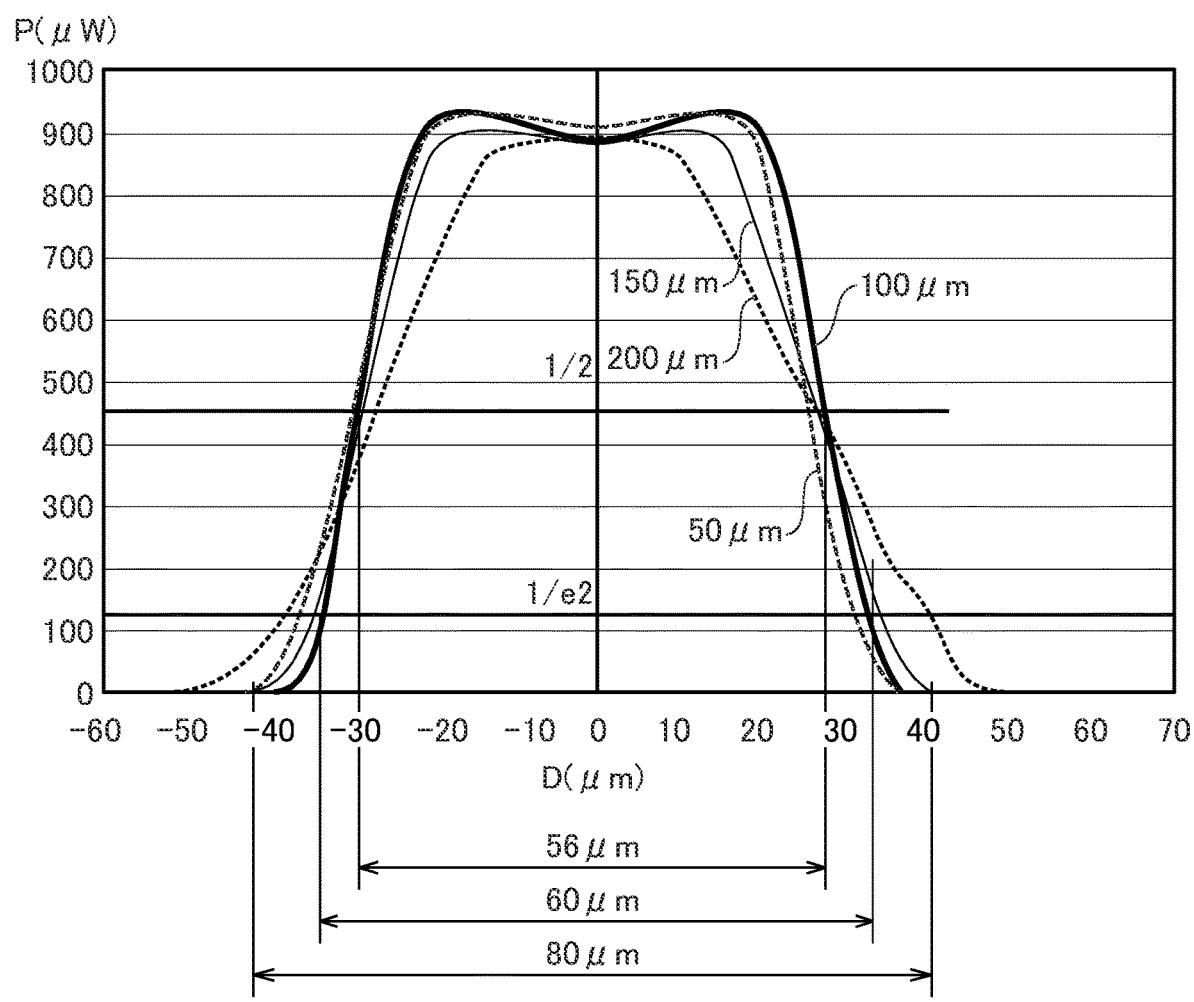

MEASUREMENT SYSTEM AND MEASUREMENT METHOD

CROSS-REFERENCE TO RELATED APPLICATIONS

This application is based upon and claims the benefit of priority from prior Japanese Patent Application P2020-131884, filed on Aug. 3, 2020; the entire contents of which are incorporated by reference herein.

BACKGROUND

Technical Field

Embodiments described herein relate generally to a measurement system and a measurement method used for measuring the characteristics of optical semiconductor elements.

Description of the Related Art

To measure the characteristics of optical semiconductor elements formed on a wafer, the optical semiconductor elements are connected to a measurement device such as a tester by use of a measurement system including optical probes through which emission light output from the optical semiconductor elements are transmitted. A measurement with a high accuracy needs to be achieved so as to accurately obtain the characteristics of the optical semiconductor elements. The measurement of the characteristics of the optical semiconductor elements with a high accuracy requires the measurement system to stably obtain accurate measurement values.

BRIEF SUMMARY

An aspect of the present disclosure provides a measurement method that shifts a relative position between an optical semiconductor element and an optical probe on a plane surface intersecting with an optical axis of an emission light output from the optical semiconductor element. The measurement method measures an incident intensity of the emission light at several positions, and obtains an incident intensity pattern showing a relationship between a change in the relative position and the respective incident intensities.

BRIEF DESCRIPTION OF THE DRAWINGS

FIG. 6 is a graph showing a relationship between a shifted distance and an incident intensity regarding an optical probe in which an incident end surface is curved.

DETAILED DESCRIPTION

Figure 1:
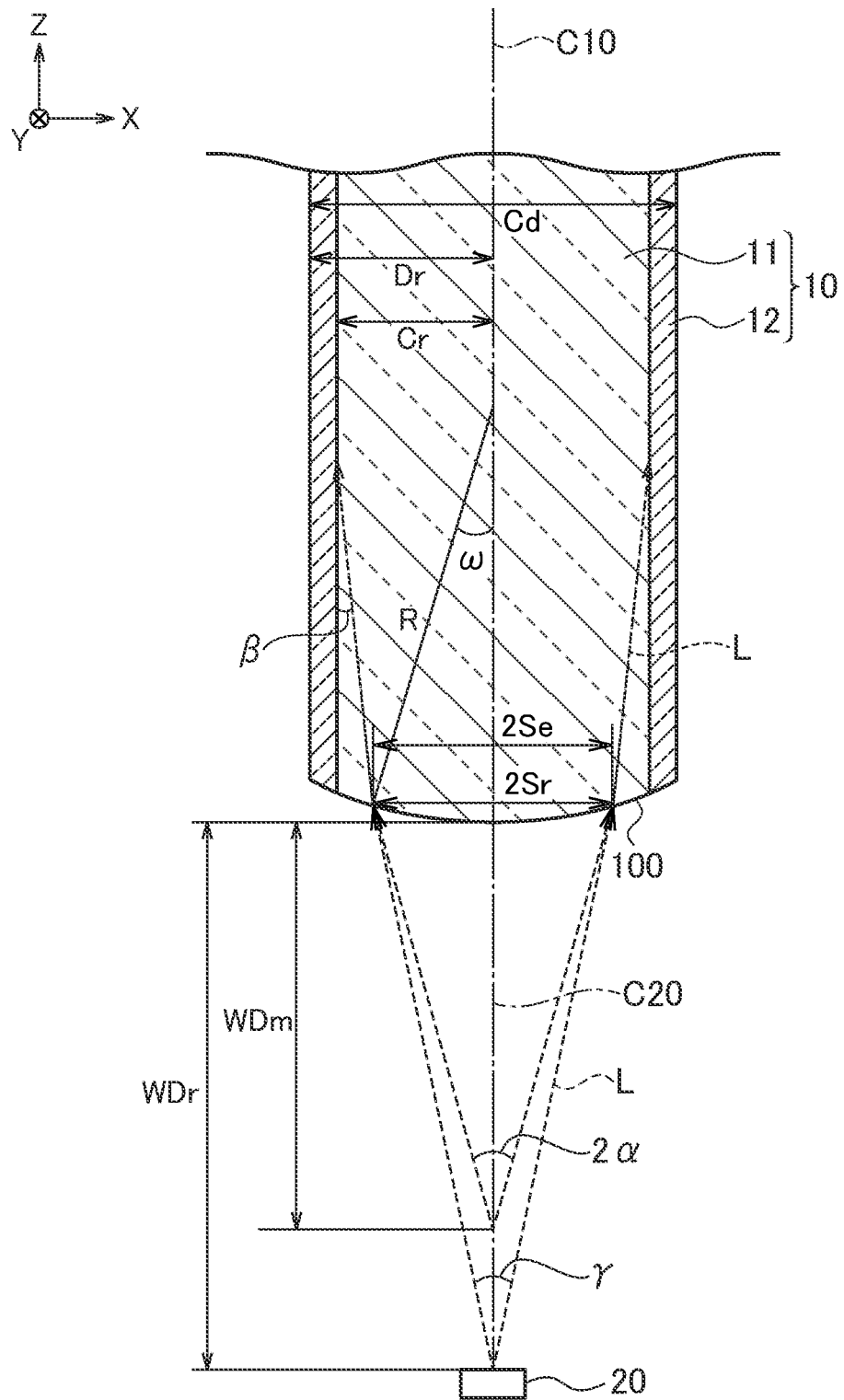
FIG. 1 is a schematic view illustrating a configuration of an optical probe used in a measurement system according to an embodiment.

Next, a description will be given of embodiments of the present invention with reference to the drawings. In the following description referring to the drawings, the same or similar reference numerals are assigned to the same or similar portions. However, it should be noted that the drawings are schematic, and that a ratio of thicknesses of respective portions, and the like are different from actual ones. Moreover, as a matter of course, also between the drawings, portions where dimensional relationship and ratio therebetween are different from each other are also included. The embodiments illustrated below are exemplifying a device and a method for embodying the technical idea of this disclosure, and the embodiments of the invention do not specify materials, shapes, structures, dispositions and the like of constituent components to those described below.

A measurement system according to an embodiment of the present invention includes optical probes including incident end surfaces that receive emission light output from optical semiconductor elements, an optical probe head that holds the optical probes, and a driving device that moves at least either the optical probe head or the optical semiconductor elements. The driving device shifts a relative position between the optical semiconductor elements and the optical probes on a plane surface intersecting with an optical axis of the emission light. The measurement system according to the embodiment measures an incident intensity of the emission light at several positions, so as to obtain an incident intensity pattern showing a relationship between a change in the relative position and the respective incident intensities.

First, the optical probe 10 used in the measurement system according to the embodiment of the present invention is described below with reference to FIG. 1. The optical probe 10 receives the emission light L output from the optical semiconductor element 20. The optical probe 10 has a graded-index optical waveguide including a core part 11 and a clad part 12 arranged along the outer circumference of the core part 11. The core part 11 has a larger refractive index than the clad part 12. FIG. 1 illustrates an end part of the optical probe 10 on one side including an incident end surface 100 on which the emission light L enters. The incident end surface 100 is a convex surface having a predetermined radius of curvature R.

FIG. 1 defines a direction parallel to a central axis C10 of the core part 11 of the optical probe 10 and an optical axis C20 of the emission light L as a Z-axis direction. FIG. 1 also defines a plane surface perpendicular to the Z axis direction as an X-Y plane, defines the right-left direction of the sheet of FIG. 1 as an X-axis direction, and defines the direction perpendicular to the sheet as a Y-axis direction.

The core part 11 has a core radius Cr, as shown in FIG. 1. The optical probe 10 has a probe radius Dr including the clad part 12. The optical probe 10 as used herein may be an optical fiber or have a configuration in which an optical fiber and a lens are combined together. For example, a graded-index (GI) optical fiber may be used to manufacture the optical probe 10.

The optical semiconductor element 20 as used herein is a vertical-cavity surface-emitting laser (VCSEL), for example. An optical signal terminal (not illustrated) of the optical semiconductor element 20 from which the emission light L is output is optically connected to the incident end surface 100 of the optical probe 10, so that the emission light L output from the optical semiconductor element 20 enters the incident end surface 100 of the optical probe 10.

The optical probe 10 and the optical semiconductor element 20 are separated from each other by a working distance WDr in the Z-axis direction. The working distance WDr is set within a range that enables the optical probe 10 to receive the emission light L output from the optical semiconductor element 20. An incident range of the emission light L may be set in a direction in which the emission light L advances at an intensity corresponding to $1/e^2$ or greater of a peak value.

As illustrated in FIG. 1, the optical semiconductor element 20 outputs the emission light L having a radiation angle α. A radius of the incident range of the emission light L on the incident end surface 100 of the optical probe 10 (referred to below as an "incident range radius Sr") is given by the following equation (1):

$$Sr = WDr \times \tan(\gamma/2) \quad (1)$$

FIG. 1 indicates the incident range of the emission light L on the incident end surface 100 as a range having a diameter of 2Sr.

A range of the incident region on the incident end surface 100 when the emission light L is transmitted to the core part 11 without passing through a boundary between the core part 11 and the clad part 12 (also referred to below as a "core boundary") is referred to below as an "effective incident range". A distance from the central axis C10 to the outer edge of the effective incident range is referred to below as an "effective incident radius Se". FIG. 1 indicates the effective incident range of the optical probe 10 as a range having a diameter of 2Se. FIG. 1 illustrates a case in which the incident range radius Sr overlaps with the effective incident radius Se.

When the incident end surface 100 is flat, a relation of Se=Cd/2 is fulfilled. When the incident end surface 100 is a curved surface having a radius of curvature R, the effective incident range depends on the radius of curvature R of the incident end surface 100. The incident range radius Sr of the emission light L also depends on the working distance WDr.

The emission light L entering the effective incident region is transmitted through the inside of the core part 11 of the optical probe 10 without passing across the core boundary. When the entire incident range of the emission light L is not within the effective incident region, at least part of the emission light L advances toward the clad part 12 across the core boundary. This causes a transmission loss of the emission light L.

A radiation angle 2α at an effective working distance WDm at which the incident range radius Sr overlaps with the effective incident radius Se and a numerical aperture NA of the incident end surface 100 fulfill a relation of $\alpha = \sin^{-1}(NA)$. When the working distance WDr is longer than the effective working distance WDm, the radiation angle 2α and the radiation angle γ fulfil a relation of γ<2α.

With regard to the emission light L having the angle α made with the optical axis C20 (referred to below as an "incident angle") at the effective working distance WDm, the following relational expressions are fulfilled on the incident end surface 100:

$$Se = R \times \sin(\omega)$$

$$\sin(\alpha+\omega) = nr \times \sin(\beta+\omega)$$

$$A = nr \times \cos(\beta) - \cos(\alpha)$$

$$B = nr \times \sin(\beta) - \sin(\alpha)$$

$$A \times \sin(\omega) + B \times \cos(\omega) = 0$$

$$(A^2 + B^2) \times \sin^2(\omega) = B^2$$

$$\sin^2(\omega) = B^2/(A^2 + B^2)$$

$$\omega = \pm \sin^{-1}[B^2/(A^2+B^2)]^{1/2}$$

where ω is a central half angle of the emission light L at the outer edge of the incident end surface 100, β is a refracting angle of the emission light L in the core part 11, in which the emission light L transmitted to the core part 11 enters the core boundary at an angle of π/2−β, and nr is a refractive index of the core part 11 at the incident position of the emission light L.

With regard to the emission light L entering the effective incident region that is a range of ±Se from the central axis C10, the refracting angle β is given by the following equation (2):

$$\beta = \sin^{-1}[\sin(\alpha 0)/nr] \quad (2)$$

where α0 is given by $\alpha 0 = \sin^{-1}(NA0)$ in which NA0 is the numerical aperture when the end surface of the optical fiber used as the optical probe 10 is flat. The refractive index nr and a refractive index nc of the core part 11 at the central axis C10 fulfill a relation as given by the following equation (3):

$$nr = nc \times [1 - (C^{1/2} \times r)^2/2] \quad (3)$$

where $C^{1/2}$ is a constant of a graded index of the core part 11, and r is a distance in the radial direction from the central axis C10 to the incident position of the emission light L.

The refracting angle β is larger as the incident angle α is larger. When the refracting angle β exceeds a predetermined critical angle, at least part of the emission light L flows out and advances toward the clad part 12 without being reflected to be transmitted in the core part 11. The emission light L in this case is mostly led to radiative decay at the clad outer circumference. The numerical aperture NA of the incident end surface 100 having the radius of curvature R fulfills a relation as given by NA=sin(α) together with the incident angle α when the refracting angle β is the critical angle.

Next, a method of measuring the emission light L by use of the optical probe 10 is described below.

When the optical semiconductor element 20 is relatively shifted with respect to the optical probe 10 on the X-Y plane, a pattern of an incident intensity depending on the change in the relative position (also referred to below as a "shifted distance") is obtained. In other words, the relative position between the optical semiconductor element 20 and the optical probe 10 is changed on the X-Y plane so as to measure the incident intensity P of the emission light L repeatedly at different positions. The incident intensity pattern showing the change in the relative position and the respective incident intensities P thus can be obtained.

The optical semiconductor element 20 is shifted with respect to the optical probe 10 in the above case. A similar incident intensity pattern can also be obtained when the optical probe 10 is shifted with respect to the optical semiconductor element 20 instead.

Figure 2:
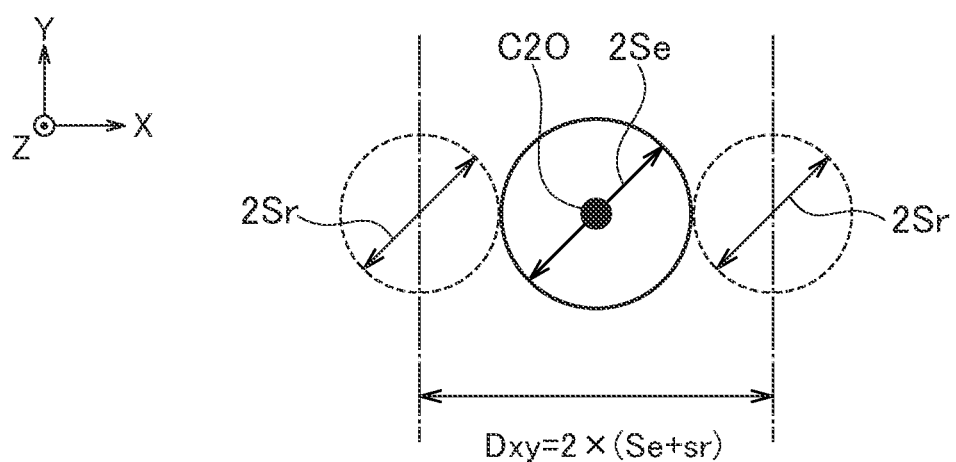
FIG. 2 is a schematic view illustrating an incident range and an effective incident range of an emission light output from an optical semiconductor element.

When the optical semiconductor element 20 is shifted in the X-axis direction or the Y-axis direction, an incident range Dxy in which at least part of the emission light L enters the optical probe 10 corresponds to 2×(Se+Sr), as shown in FIG. 2. The emission light L totally enters the optical probe 10 when the incident range Dxy corresponds to 2×(Se−Sr). The intensity characteristics in which a peak value of the emission light L is stable in the incident intensity pattern can be obtained when the emission light L totally enters the optical probe 10. When the incident range Dxy exceeds the region of 2×(Se−Sr), the emission light L after entering the optical probe 10 is damped.

Figure 3A:
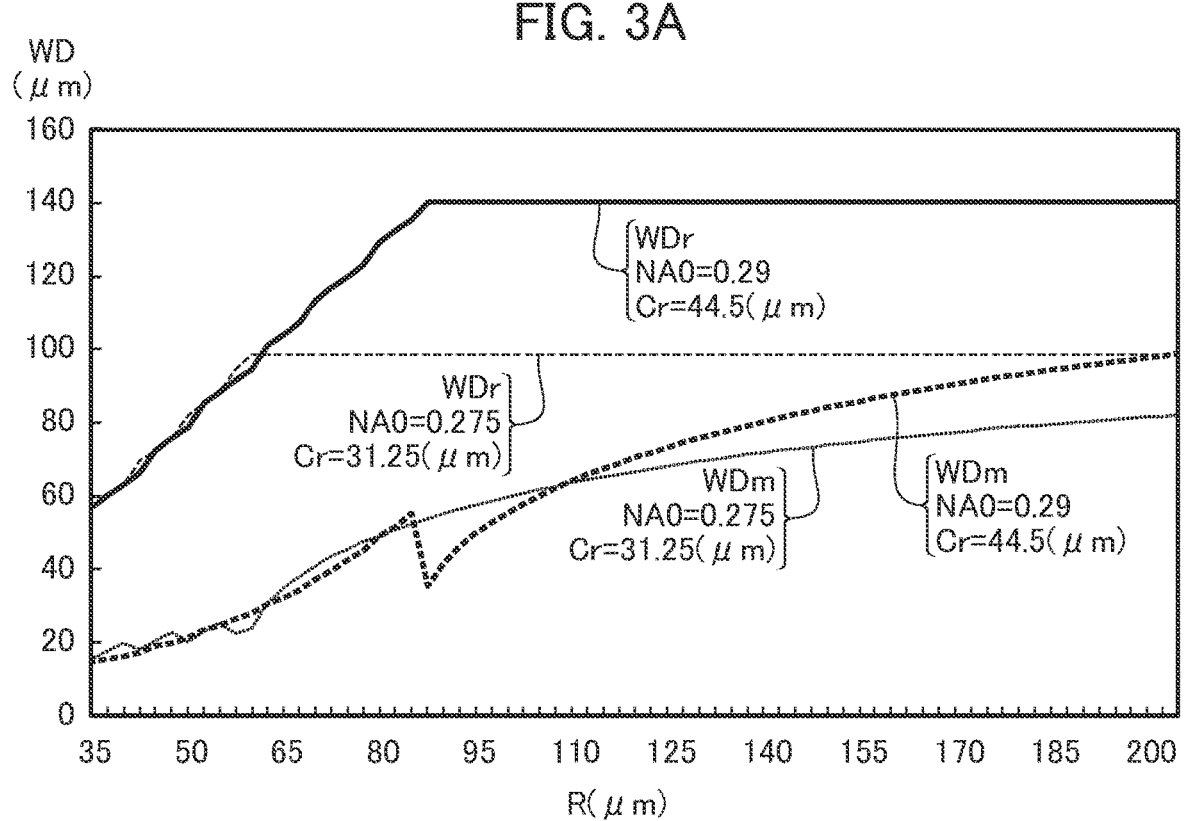
FIG. 3A is a graph showing a relationship between a radius of curvature of an incident end surface of the optical probe and a working distance.
Figure 3B:
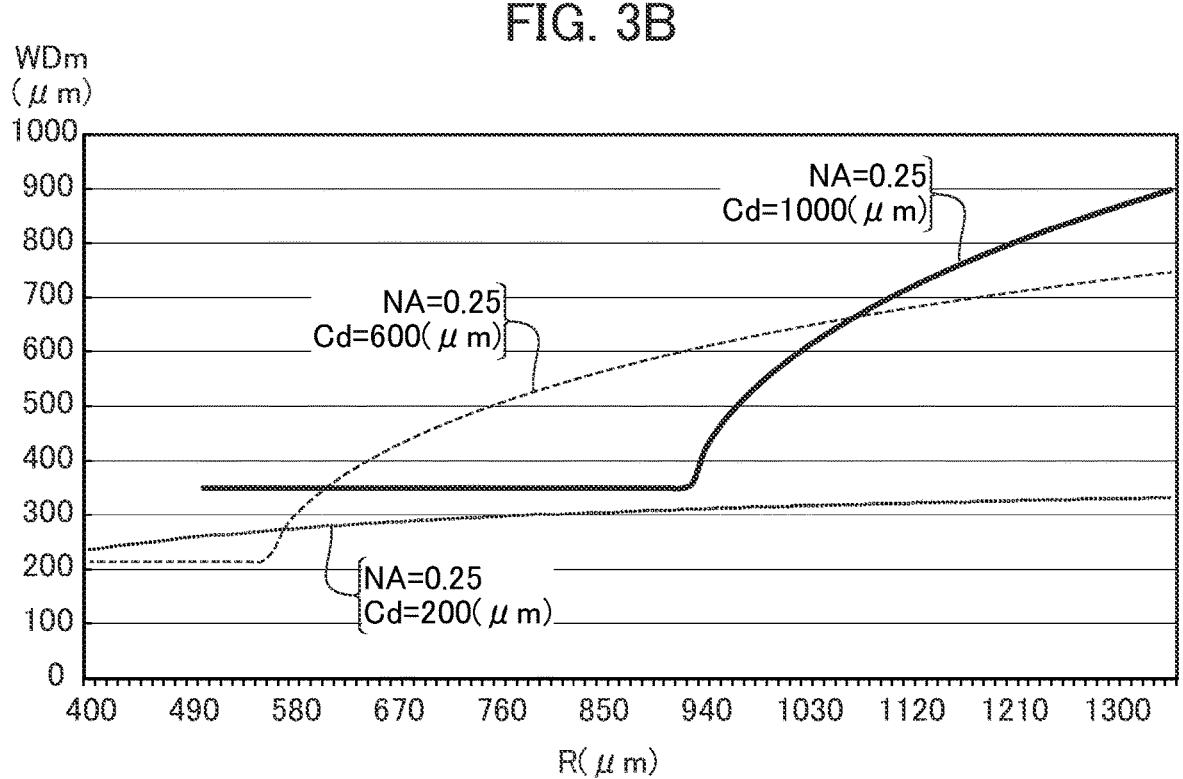
FIG. 3B is a graph showing a relationship between the radius of curvature of the incident end surface of the optical probe and an effective working distance.

FIG. 3A and FIG. 3B are graphs showing a relationship between the radius of curvature R of the incident end surface 100 and the effective working distance WDm, and a relationship between the radius of curvature R and the working distance WDr. FIG. 3A shows the relationship between the radius of curvature R and the working distance WD when an optical fiber with a core diameter Cr=44.5 μm and NA0=0.29 is used as the optical probe 10 and when an optical fiber with a core diameter Cr=31.25 μm and NA0=0.275 is used as the optical probe 10.

FIG. 3B is the graph showing the relationship between the radius of curvature R and the effective working distance WDm when large aperture optical fibers with core diameters Cd of 200, 600, and 1000 μm are each used as the optical probe 10. The numerical aperture NA0 of the respective optical fibers is 0.25.

The effective working distance WDm is given by the following equation (4):

$$WDm = Se/\tan(\alpha) \quad (4)$$

When the radiation angle γ of the emission light L of the optical semiconductor element 20 fulfills a relation of α≥γ/2, the incident range radius Sr and the effective incident radius Se fulfill a relation of Se≥Sr. The working distance WDr in this case under the condition of R≤Cd is given by the following equation (5):

$$WDr = Se/\tan(\gamma/2) \quad (5)$$

The working distance WDr under the condition of R>Cd is given by the following equation (6):

$$WDr = Sr/\tan(\gamma/2) \quad (6)$$

The working distance WD thus fulfills the relation of WDr>WDm.

Setting the working distance WD to be longer than the effective working distance WDm and approximate to the working distance WDr expands the incident range of the emission light L of the optical semiconductor element 20 on the incident end surface 100 more than a case in which the working distance WD is equal to the effective working distance WDm. This reduces an influence by a variation in the incident intensity pattern of the emission light L, including an influence by the reflected returning light in the optical probe 10 and an influence by a distortion of the shape of the incident end surface 100 of the optical probe 10. The reduction of the influence stabilizes the incident intensities of the emission light L and flattens the peak values in the incident intensity pattern, as described below.

Figure 4:
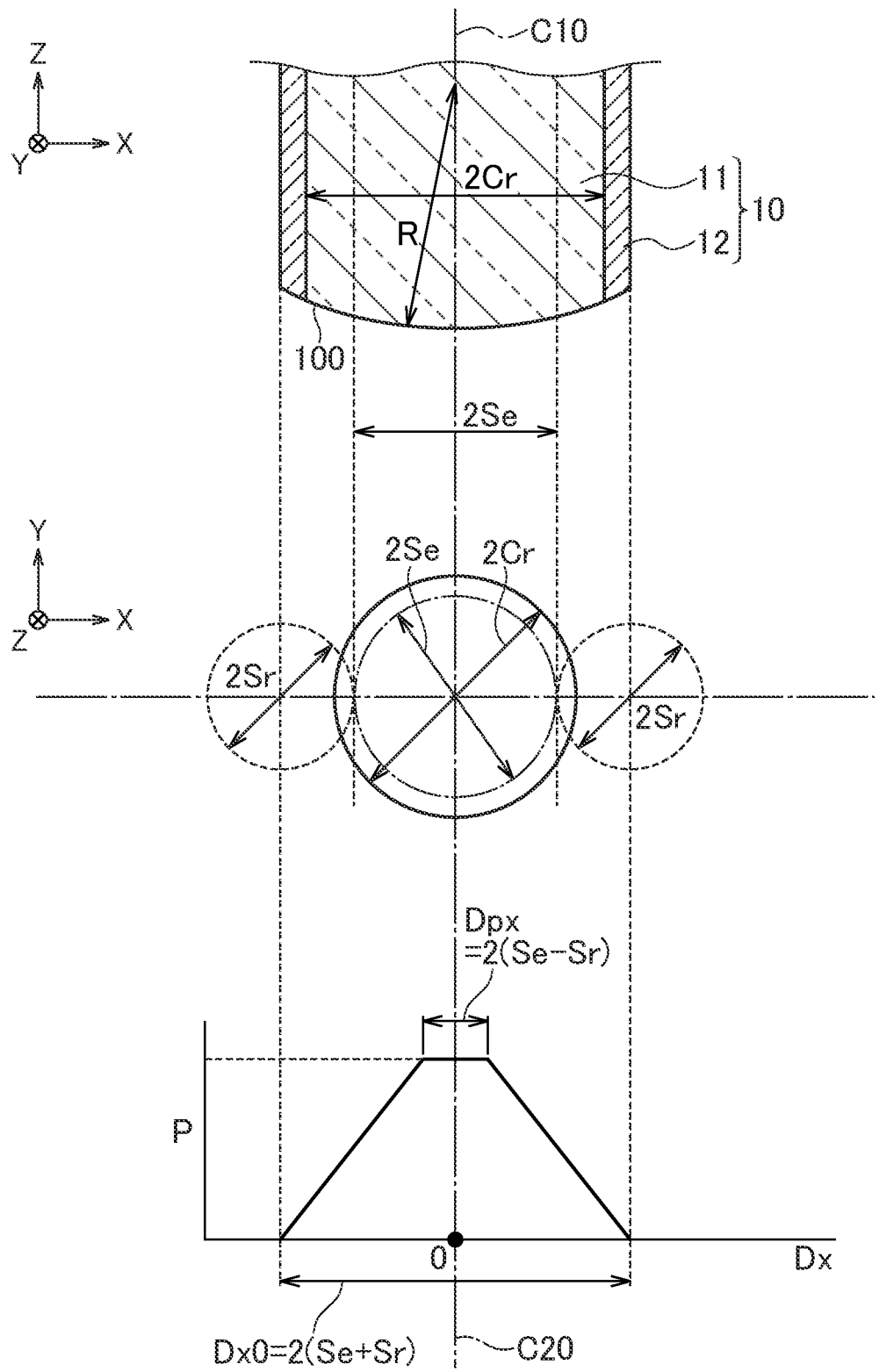
FIG. 4 is a schematic view and a graph for explaining a method of obtaining an incident intensity pattern.

FIG. 4 illustrates a change in the incident intensity pattern of the emission light L when the relative position between the optical probe 10 and the optical semiconductor element 20 is shifted in the X-axis direction.

The upper-level view in FIG. 4 is a schematic view around the circumference of the incident end surface 100 of the optical probe 10. The intermediate-level view in FIG. 4 is a plan view as viewed in the Z-axis direction showing the incident range (2Sr) of the emission light L, the effective incident range (2Se), and the diameter (2Cr) of the core part 11 of the optical probe 10. The lower-level view in FIG. 4 is a graph showing the incident intensity pattern.

The incident intensity pattern shown in FIG. 4 shows a relationship between the shifted distance Dx in the X-axis direction and the incident intensities P when the optical semiconductor element 20 is shifted in the X-axis direction. As shown in FIG. 4, the incident intensity pattern of the optical probe 10 with respect to the shifted distance Dx of the optical semiconductor element 20 has a trapezoidal shape in which the flat part corresponds to the peak values of the incident intensities P. The shifted distance Dx in which the incident intensities P have the peak values in the incident intensity pattern (referred to below as a "first shifted distance Dxp") is given by the following equation (7):

$$Dxp = 2 \times (Se - Sr) \quad (7)$$

The shifted distance Dx in which the incident intensities P are greater than zero in the incident intensity pattern (referred to below as a "second shifted distance Dx0") is given by the following equation (8):

$$Dx0 = 2 \times (Se + Sr) \quad (8)$$

Measuring the first shifted distance Dxp and the second shifted distance Dx0 as described above can calculate the effective incident radius Se and the incident range radius Sr in accordance with the following equations (9) and (10):

$$Se = (Dxp + Dx0)/4 \quad (9)$$

$$Sr = (Dx0 - Dxp)/4 \quad (10)$$

An average of the incident intensities P in the range of ±(Se−Sr) in the incident intensity pattern is preferably calculated and used as the incident intensity P. The use of the average of the incident intensities P cancels a fine intensity variation in the measured values, so as to use the incident intensity P as a stable measured value. The average of the incident intensities P in the predetermined range of the incident intensity pattern is referred to below as an "average intensity Pa".

The radiation angle γ is calculated by use of the working distance WD upon the measurement in accordance with the following equation (11):

$$\gamma = 2 \times \tan^{-1}(Sr/WD) \quad (11)$$

The incident intensity pattern actually measured has a shape different from the trapezoidal shape. However, defining an approximate straight line on the basis of the actual value can set the first shifted distance Dxp and the second shifted distance Dx0.

When the incident intensity of the emission light L of the optical semiconductor element 20 is directly measured not via the optical probe 10 but by use of a photodetector such as an optical power meter, for example, and is defined as an incident intensity true value P0, a relation between the incident intensity P measured via the optical probe 10 and the incident intensity true value P0 is given by P0=K×P, where K is a correction coefficient. The incident intensity P, which is measured via the optical probe 10, includes various kinds of loss such as a loss due to a reflection on the end surface and a radiant transmission loss upon the transmission through the core waveguide. The use of the correction coefficient K thus can correct the incident intensity P obtained by the measurement by use of the optical probe 10 to the incident intensity true value P0.

The correction coefficient K is a characteristic coefficient set to the optical probe 10 in accordance with the end surface reflection of the emission light L on the incident end surface 100, the radiation loss or the transmission loss of the emission light L when transmitted to the optical probe 10, and the sum of the respective losses set according to an optical circuit configuration and the like. The correction coefficient K may be preliminarily set when the emission light L is measured by use of the optical probe 10. The setting of the correction coefficient K is made as follows, for example. First, a current-output property S1 of the optical semiconductor element 20 is measured accurately with an optical power meter. Next, a current-output property S2 of the optical semiconductor element 20 is measured by use of an optical circuit system using the optical probe 10 under the same measurement conditions as the measurement with the optical power meter. The correction coefficient K of the optical probe 10 is then obtained in accordance with the incident intensity P1 of the current-output property S1 and the incident intensity P2 of the current-output property S2 under the same current-application conditions, and is given by K=P1/P2.

Figure 5:
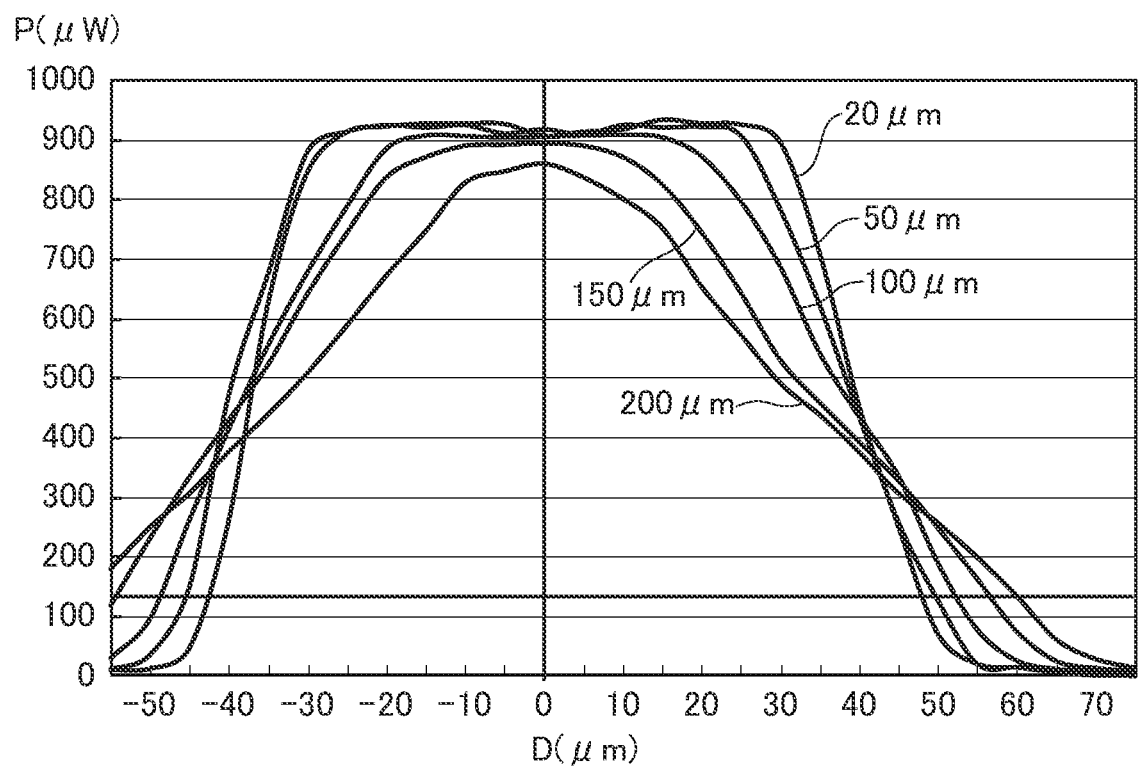
FIG. 5 is a graph showing a relationship between a shifted distance and an incident intensity regarding an optical probe in which an incident end surface is flat.

FIG. 5 is a graph showing a relationship between the shifted distance D between the optical probe 10 and the optical semiconductor element 20 in the X-axis direction or the Y-axis direction and the incident intensities P when an optical fiber having a flat incident end surface with a core diameter Cd=89 μm and a numerical aperture=0.29 is used as the optical probe 10. A VCSEL with a radiation angle γ=21.5° is used as the optical semiconductor element 20. The optical semiconductor element 20 is shifted in the X-axis direction or the Y-axis direction so as to measure the incident intensities P when the working distance WD is set to each of 20, 50, 100, 150, and 200 μm.

The peak values of the incident intensities P, which are flat about 900 μW in the case of the working distance WD<50 μm, each show a fine variation due to the influence by the reflected returning light. The fine variation does not appear in the incident intensities in the case of the working distance WD=150 μm, although the flat part is decreased in the incident intensities P. The reason for this is that the irradiation diameter (=2×Sr) and the incident diameter (=2×Se) of the VCSEL are substantially equal to each other. The incident diameter in this case is equal to the core diameter, and is given by 2×Se=Cd. The peak values of the incident intensities P decrease as the working distance WD is longer when the working distance WD is 150 μm or longer.

As shown in FIG. 5, the incident intensities P have the peak values that are flat when the working distance WD is in the range of 20 to 100 μm. The incident intensities P show a fine variation when the working distance WD is in the range of 20 to 50 μm due to a resonance of the reflected returning light of the emission light L from the incident end surface 100, since the distance between the VCSEL and the incident end surface 100 of the optical probe 10 is small. The region of the peak values of the incident intensities P is substantially flat in the case of the working distance WD=100 μm. The influence on the incident intensities P due to the reflected returning light or the intensity distribution of the VCSEL is decreased as the working distance WD is longer, and the fine variation in the peak values of the incident intensities P tends to disappear.

In the case of the working distance WD=150 μm, Sr is 27.5 μm in accordance with the equations of Se−Sr=10 μm and Se+Sr=65 μm. The radiation angle γ of the VCSEL is thus given by γ=2×tan⁻¹(27.5/150)=20.8°.

FIG. 6 is a graph showing a measurement example of the incident intensity pattern of the optical probe 10 having the incident end surface with the radius of curvature R of 70 μm using the optical fiber with the core diameter Cd=89 μm and the numerical aperture NA0=0.29. FIG. 6 shows the incident intensity pattern in a case of varying the working distance WD in the range of 50 μm to 200 μm.

As shown in FIG. 6, the peak values of the incident intensities P show less fine variation when the optical probe 10 has the curved incident end surface 100. The shifted distance D in which the incident intensities P show the peak values is shorter as the working distance WD is longer. However, the peak values of the incident intensities P that depend on the working distance WD tend to have less variation, since the emission light L is narrowed due to the lens effect of the incident end surface 100. As compared with the case in FIG. 5, the optical probe 10 having the curved incident end surface 100 does not cause a decrease in the values of the incident intensities P adjacent to the optical axis, but has a wider flat region of the peak values regardless of whether the working distance WD is large.

In the case of the working distance WD in the range of 50 to 100 μm, the region of the peak values of the incident intensities P about the position adjacent to the optical axis is slightly depressed because the incident intensity pattern is influenced by the intensity distribution (a near field pattern) of the VCSEL. In the case of the working distance WD≥150 μm, the region of the peak values of the incident intensities P is substantially flat due to the equalization of the radiation light derived from a spherical wave expansion. In addition, since the incident end surface 100 is curved, the core radius Cr and the effective incident radius Se fulfill the relation of Cr≥Se. In the case of the working distance WD=150 μm, when the equations of Se−Sr=18 μm, Se+Sr=38 μm, and Sr=28 μm are fulfilled, the radiation angle γ is given by γ=2×tan⁻¹(28/150)=21.2°.

As described above, the radiation angle γ at the defined working distance WD thus can be easily measured in accordance with the incident intensity pattern of the optical probe 10.

Figure 7A:
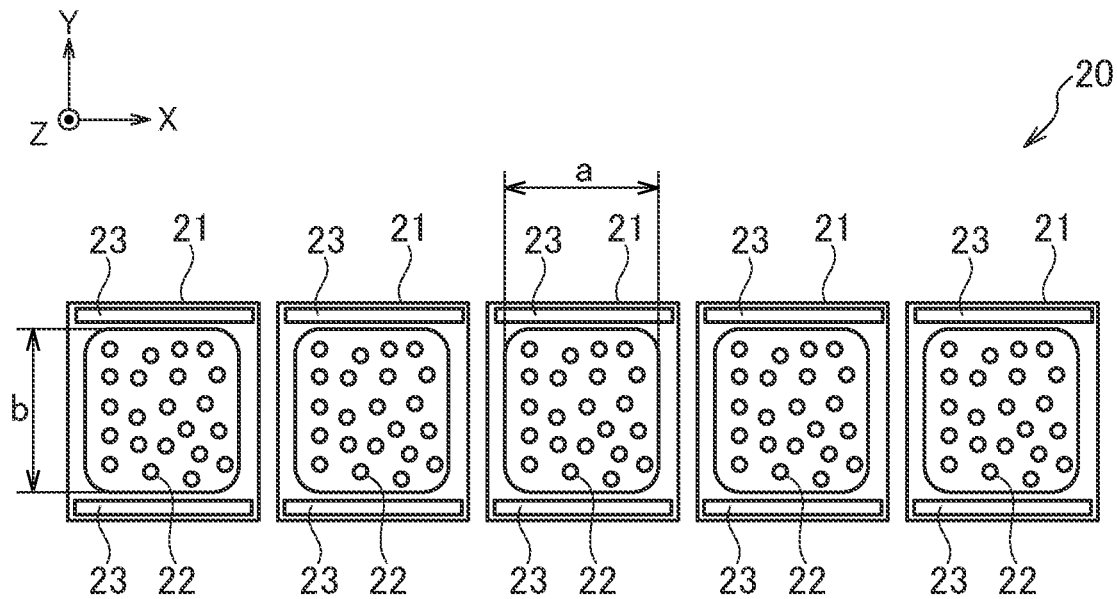
FIG. 7A is a schematic plan view of a VCSEL.
Figure 7B:
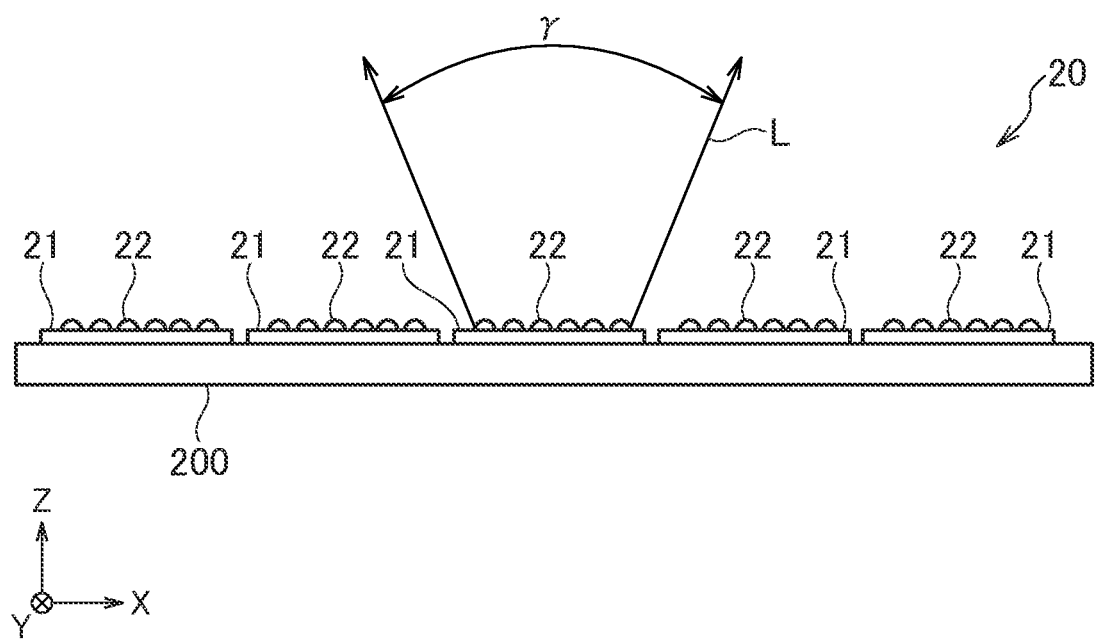
FIG. 7B is a schematic side view of the VCSEL.

FIG. 7A and FIG. 7B are views showing an example of a large-output VCSEL in which the optical semiconductor element 20 emits light from plural light-emitting parts 21. The optical semiconductor element 20 illustrated in FIG. 7A and FIG. 7B is the large-output VCSEL used for lighting or for a sensor. As illustrated in FIG. 7B, the optical semiconductor element 20 is formed on a wafer 200.

The optical semiconductor element 20 includes the plural light-emitting parts 21 having a large aperture. The light-emitting parts 21 each include a plurality of luminous bodies 22. As illustrated in FIG. 7A, the light-emitting parts 21 each have a rectangular shape in which the side surfaces adjacent to each other have lengths of a and b so as to have an area of "a×b". In particular, the side in the shifted direction (the X-axis direction) in which the relative position between the optical probe 10 and the optical semiconductor element 20 is shifted has the length of a, and the side in the direction (the Y-axis direction) intersecting with the shifted direction has the length of b. The optical semiconductor element 20 has a size of about several millimeters, and obtains an output of light emission of several watts due to the plural luminous bodies 22 included therein. The optical semiconductor element 20 includes electrical signal pads 23 on the respective surfaces of the light-emitting parts 21 so as to receive electrical signals. A ground of the optical semiconductor element 20 is on the rear surface.

The incident intensity P and the radiation angle γ can be measured also for a plurality of VCSELs with the large output and the large aperture formed on the wafer 200 by use of the optical probes 10 or an optical probe array including the plural optical probes 10 aligned therein. A method of measuring the incident intensity pattern of the large-output VCSEL illustrated in FIG. 7A and FIG. 7B by use of the optical probes 10 is described below with reference to FIG. 8. The incident intensity pattern is obtained such that the relative position between the optical probe 10 and the VCSEL is shifted in the X-axis direction in the predetermined working distance WD, for example.

The optical probe 10 to be used is the optical fiber with the core diameter Cd and the effective incident radius Se. The emission light L is caused to enter the incident end surface 100 of the optical probe 10 so as to measure the incident intensity P.

Figure 8:
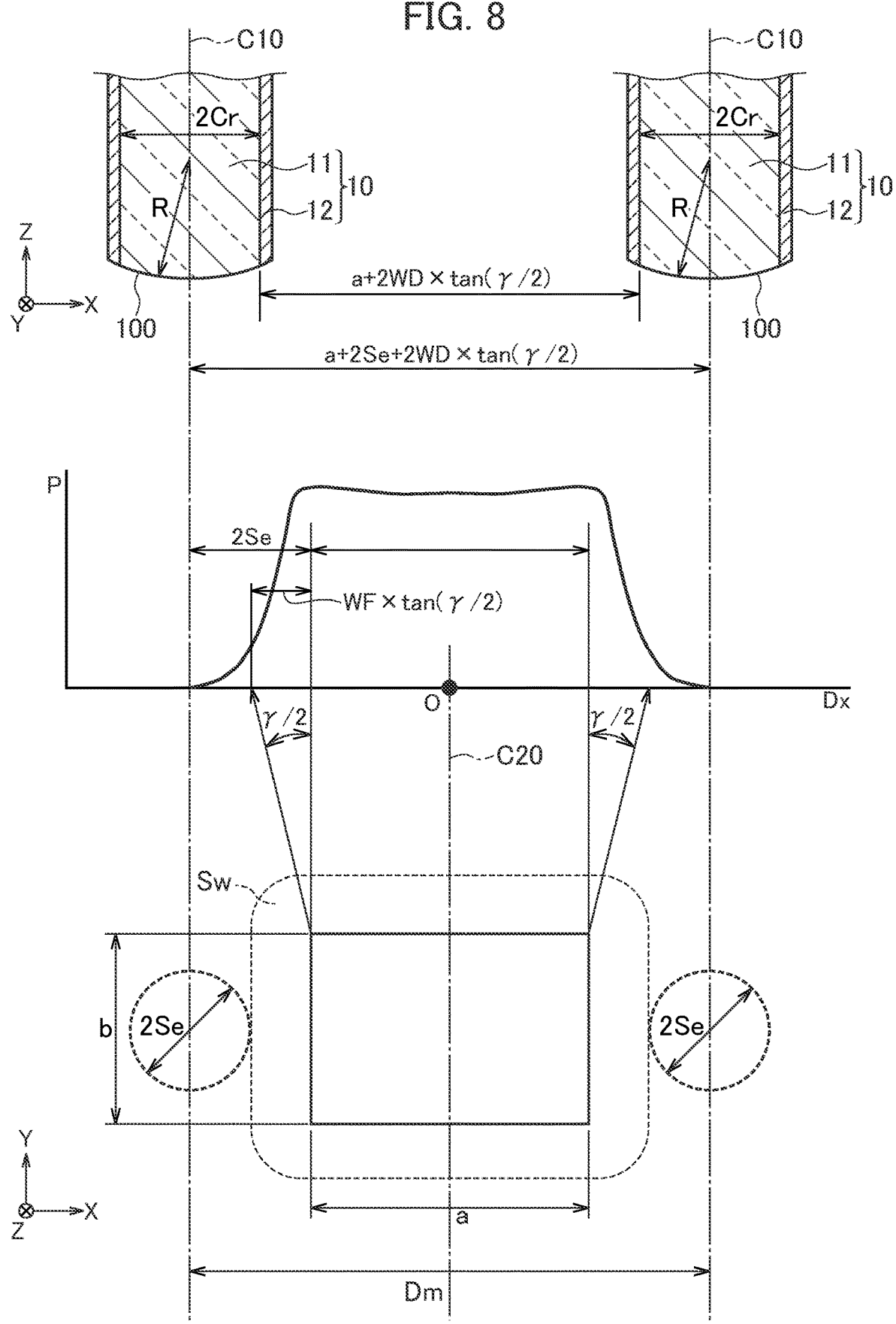
FIG. 8 is a schematic view and a graph for explaining a method of obtaining an incident intensity pattern of the VCSEL.

The optical probe 10 is shifted in the X-axis direction in the predetermined working distance WD. A gap between the central axes of the optical probes 10 at both ends of the area in which the incident intensities P are greater than zero is $a+2Se+2WD\times\tan(\gamma/2)$, as shown in FIG. 8. A gap between the respective core parts 11 is $a+2WD\times\tan(\gamma/2)$.

An average of the incident intensities P of the emission light L at several positions measured every time the optical probe 10 is shifted in the X-axis direction is presumed to be an average intensity Pa. An intensity energy density Ed is calculated by use of the average intensity Pa in accordance with the following equation (12):

$$Ed=Pa/(\pi\times Se)^2 \quad (12)$$

An area Sw of the incident range on the incident end surface 100 is obtained in accordance with the following equation (13):

$$Sw=[a+2WD\times\tan(\gamma/2)]\times[b+2WD\times\tan(\gamma/2)] \quad (13)$$

The incident intensity true value P0 of the optical semiconductor element 20 is given by the following equation (14):

$$P0=K\times Ed\times Sw \quad (14)$$

where K is a correction coefficient. For example, the correction coefficient K is set in accordance with the incident intensity true value P0 measured directly by the optical power meter and the incident intensity P1 measured by use of the optical probe 10, and is given by the following equation (15):

$$K=P0/P1(K>1) \quad (15)$$

The correction coefficient K of all of the optical probes 10 used for the measurement may be set before the measurement made for the optical semiconductor element 20. The optical fiber used as the optical probe 10 may be chosen from optical fibers having a core diameter Cd in a range of about 100 μm to 1000 μm, for example, depending on the size of the optical semiconductor element 20 to be measured. The core part 11 of the optical probe 10 to be used may be either a graded index type or a step index type.

The actual value of the shifted distance Dx in which the incident intensities P are greater than zero in the incident intensity pattern shown in FIG. 8 is obtained as a shifted distance Dm based on the radiation angle γ in accordance with the following equation (16):

$$Dm=a+2Se+2WD\times\tan(\gamma/2) \quad (16)$$

Since the length of a in the equation (16) is already known, the radiation angle γ is calculated in accordance with the following equation (17) based on the set working distance WD after the value of the effective incident radius Se is obtained:

$$\gamma=2\times\tan^{-1}\{[Dm-(a+2Se)]/2WD\} \quad (17)$$

As described above, the optical probe 10 or the optical semiconductor element 20 is shifted in the X-axis direction or the Y-axis direction to obtain the incident intensity pattern, so as to stably measure the incident intensity P. Namely, obtaining the peak values of the incident intensities P in the stable region in the incident intensity pattern or the average thereof can stably measure the incident intensity P approximate to the incident intensity true value P0 of the emission light L of the optical semiconductor element 20.

Figure 9:
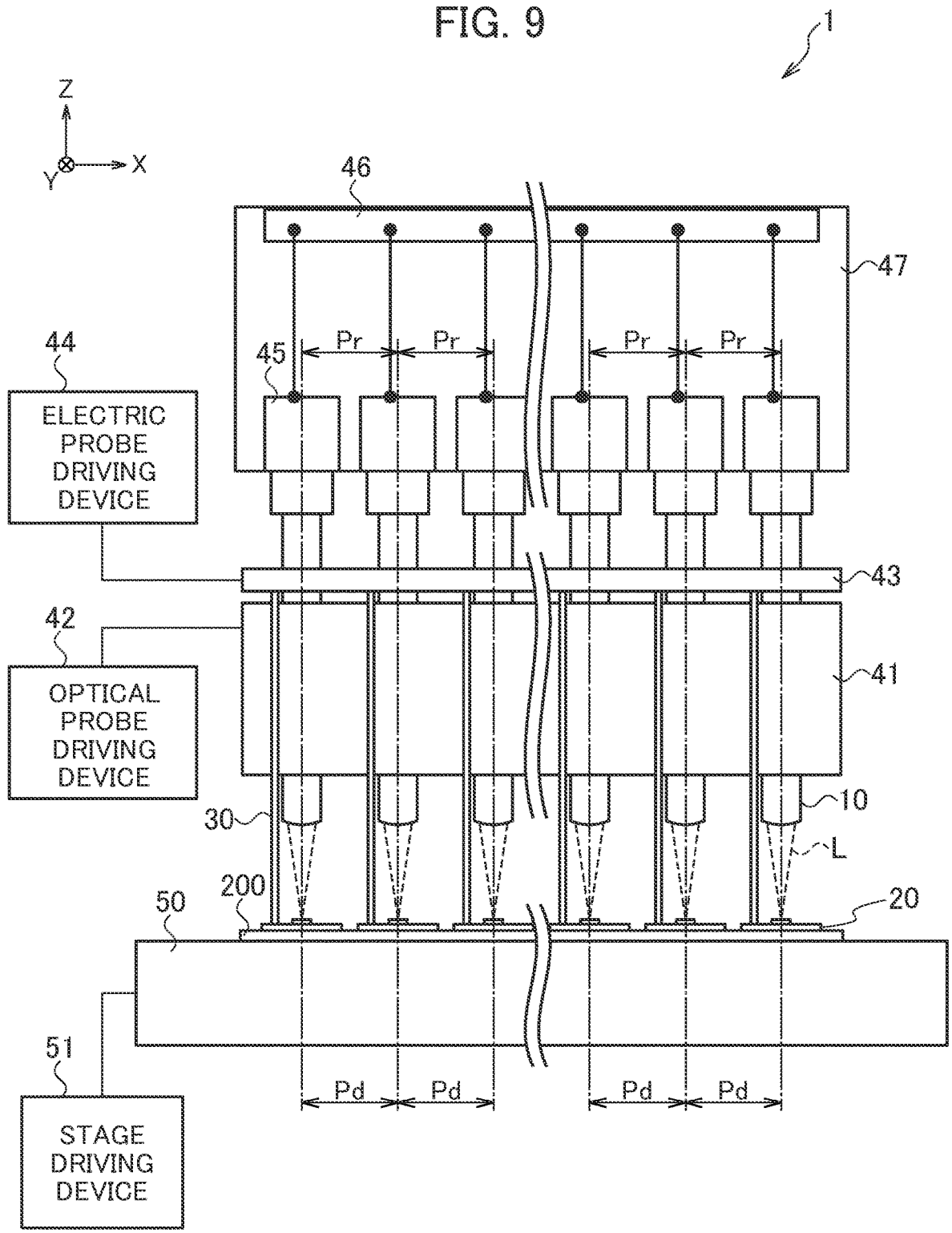
FIG. 9 is a schematic view illustrating a configuration of a measurement system according to the embodiment of the present invention.

FIG. 9 shows an example of a measurement system 1 using the optical probes 10. The measurement system 1 illustrated in FIG. 9 includes an optical probe head 41 that holds an optical probe array including the optical probes 10 arranged in array, and an electric probe head 43 that holds an electric probe array including a plurality of electric probes 30 in array. The electric probe 30 as used herein may be a cantilever type, a vertical needle type, or a vertical spring type, for example. The respective optical probes 10 and the respective electric probes 30 are arranged at regular intervals at a pitch Pr in the X-axis direction. The respective optical probes 10 and the respective electric probes 30 may also be arranged at regular intervals in the Y-axis direction.

The measurement system 1 is used for measuring the characteristics of the plural optical semiconductor elements 20 formed in the wafer 200. The optical semiconductor elements 20 are arranged at regular intervals at a pitch Pd in the X-axis direction on the main surface of the wafer 200. The pitch Pd corresponds to the pitch Pr. A displacement between the position of the light-emitting part of the optical semiconductor element 20 and the position of the central axis of the optical probe 10 corresponding to the light-emitting part is preferably five micrometers or smaller, for example, for a reduction in error of the measurement value.

The wafer 200 provided with the optical semiconductor elements 20 thereon is mounted on a stage 50 and aligned with a predetermined reference position. The wafer 200 may be fixed to the stage 50 by use of an adsorbing device (not illustrated). The fixation of the wafer 200 to the stage 50 may be made by a means of vacuum chucking, for example, or may be made by any other means.

For example, a pair of the optical probe 10 and the electric probe 30 is used to correspond to each optical semiconductor element 20. Namely, a single probe unit including the optical probe 10 and the electric probe 30 is arranged with respect to the single optical semiconductor element 20. The respective probe units are arranged to correspond to the respective positions of the optical semiconductor elements 20 formed on the wafer 200. While FIG. 9 illustrates the case in which the single optical probe 10 and the single electric probe 30 are included in the single measurement unit, the number of each of the optical probe 10 and the electric probe 30 included in each measurement unit may be determined as appropriate depending on the configuration and the measurement contents of the optical semiconductor elements 20. For example, a pair of an electric probe 30 for power supply and an electric probe 30 for ground may be used to implement an electric probe array. Namely, the two electric probes 30 of the electric probe 30 for power supply and the electric probe 30 for ground may be arranged to correspond to the single optical probe 10.

The optical probe head 41 is moved by the control made by an optical probe driving device 42. For example, the control made by the optical probe driving device 42 enables a fine adjustment of the working distance WD between the incident end surface 100 of the optical probe 10 and the optical semiconductor element 20. The electric probe head 43 is moved by the control made by an electric probe driving device 44. For example, the control made by the electric probe driving device 44 enables a fine adjustment of the distance between the tip end of the electric probe 30 and the optical semiconductor element 20 in the Z-axis direction.

The alignment of the optical probe head 41 and the electric probe head 43 with the respective optical semiconductor elements 20 in the X-axis direction and the Y-axis direction may be made such that the stage 50 is moved by a stage driving device 51. In addition, the stage 50 may be rotated about the Z-axis direction by the stage driving device 51 so as to adjust the positions of the optical probe 10 and the electric probe 30 with respect to the optical semiconductor element 20 in the rotating direction about the Z-axis direction (referred to below as a "Z-axis rotating direction").

Alternatively, the optical probe head 41 and the electric probe head 43 may be moved in the respective directions of the X-axis direction, the Y-axis direction, and the Z-axis direction while the position of the stage 50 is fixed. In particular, the relative position of the optical probe 10 and the electric probe 30 with respect to the optical semiconductor element 20 may be adjusted by the optical probe driving device 42 and the electric probe driving device 44.

As described above, the measurement system 1 as illustrated in FIG. 9 enables the alignment of the optical probe 10 and the electric probe 30 with the optical semiconductor element 20. The measurement system 1 may be configured so as to control the position of the optical probe head 41 and the position of the electric probe head 43 independently of each other. As an alternative method, the stage 50 may be moved in the X-axis direction, the Y-axis direction, the Z-axis direction, and the Z-axis rotating direction while the respective positions of the optical probe head 41 and the electric probe head 43 are fixed, so as to control the relative position of the optical probe 10 and the electric probe 30 with respect to the optical semiconductor element 20. Various kinds of adjusting methods thus can be used for the alignment of the optical probe 10 and the electric probe 30 with the optical semiconductor element 20 as described above.

The electrical signal and the optical signal are transmitted through the measurement system 1 so as to execute the measurement of the optical semiconductor element 20. For example, the electrical signal output from a tester (not illustrated) is sent to the electric probe 30 via a connection terminal (not illustrated) provided in the electric probe head 43. The electricity is thus suppled to the optical semiconductor element 20. When the optical semiconductor element 20 is a VCSEL, the electrical signal is applied to an electrical signal pad provided on the top surface of the VCSEL via the electric probe 30, so that the VCSEL supplied with the electricity outputs the emission light L. The emission light L is then received by the optical probe 10.

The way of supplying the electricity to the optical semiconductor element 20 may be determined as appropriate. For example, the electricity may be supplied to the alternate optical semiconductor elements 20 in order, or may be supplied to the plural optical semiconductor elements 20 simultaneously. To avoid crosstalk of the optical semiconductor elements 20 adjacent to each other, the electricity may be supplied to the optical semiconductor elements 20 alternately or at several intervals in order or simultaneously.

The respective optical probes 10 are connected to a photoelectric converter 47 including photoelectric conversion modules 45 and an electrical connection terminal 46. The emission light L output from the respective optical semiconductor elements 20 is transmitted to the respective photoelectric conversion modules 45 optically connected to the optical probes 10. The respective photoelectric conversion modules 45 convert the emission light L into the electrical signal, and outputs the converted electrical signal to the electrical connection terminal 46. The electrical connection terminal 46 is electrically connected to the tester (not illustrated), and the electrical signal photoelectrically converted from the emission light L is sent to the tester from the electrical connection terminal 46, so as to convert the current value measured to an optical output value.

The photoelectric conversion modules 45 as used herein may be a module that converts the optical signal of the emission light L substantially linearly to the electrical signal in accordance with the output of the emission light L by a photodetector or the like, or may be a module that diffracts the emission light L by a diffraction grating device so as to detect the wavelength variation characteristics of the emission light L in accordance with the diffraction angle direction. The type of the photoelectric conversion modules 45 to be used may be varied depending on the measurement purpose. The emission light L may also be branched in front of the respective photoelectric conversion modules 45, so as to simultaneously execute various kinds of measurement. Photoelectrically converting the output of the optical probes 10 around the optical probe head 41 by the photoelectric converter 47 can simplify the measurement system 1, accelerate the measurement time, and improve the repeated reproducibility of the measured values. The measurement of the optical semiconductor elements 20 as described above can be made efficiently by use of a probe card including the optical probes 10 and the optical probe head 41 holding the optical probes 10.

Upon the measurement of the optical semiconductor element 20, the working distance WD between the incident end surface 100 of the optical probe 10 and the optical semiconductor element 20 is set to be approximate to the working distance WDr described above or set to be the working distance WDr or greater. This stabilizes the peak values of the incident intensities P of the emission light L and flattens the peak values with respect to the shifted distance for the respective optical probes 10 included in the optical probe array.

The measurement system 1 moves the optical probes 10 in the X-axis direction or the Y-axis direction or in both the X-axis direction and the Y-axis direction while keeping the working distance WD constant, so as to obtain the incident intensity pattern of the emission light L via the photoelectric converter 47. The data obtained by the measurement system 1 is any of the incident intensity pattern in the X-axis direction, the incident intensity pattern in the Y-axis direction, or the incident intensity pattern in both the X-axis direction and the Y-axis direction of the respective optical semiconductor elements 20. To obtain the incident intensity pattern, the measurement system 1 shifts the optical probes 10 in the X-axis direction or the Y-axis direction within a range of −50 μm to +50 μm, obtains the incident intensities P at a pitch of 5 μm, and converts the incident intensities P obtained at several positions to data, for example. The interval of the pitch may be determined as appropriate depending on the size of the optical semiconductor element 20 to be measured, the radiation angle γ of the emission light L, and the measurement time, for example.

As described above, the measurement system 1 obtains the incident intensity pattern of the respective optical semiconductor elements 20 formed on the wafer 200 as illustrated in FIG. 4 or FIG. 8. The incident intensity P and the radiation angle γ are calculated for each optical semiconductor element 20 in accordance with the incident intensity pattern. Using the average intensity Pa in the region in which the peak values are stable and flat in the incident intensity pattern can calculate the incident intensity P and the radiation angle γ accurately.

The measurement system 1 obtains the incident intensity pattern so as to calculate not the incident intensity P at a single position of the optical axis C20 but the average intensity Pa as an average of the incident intensities P at the peak values. The average intensity Pa is the average of the incident intensities P at several positions, such as three positions, adjacent to the optical axis C20. The use of the average intensity Pa can avoid or reduce a variation of the incident intensities of the respective optical semiconductor elements 20 upon the measurement and a fine variation in the incident intensity pattern derived from a distortion of the shape of the incident end surface 100 of the optical probe 10. The measurement system 1 thus can measure the incident intensity P stably.

Figure 10:
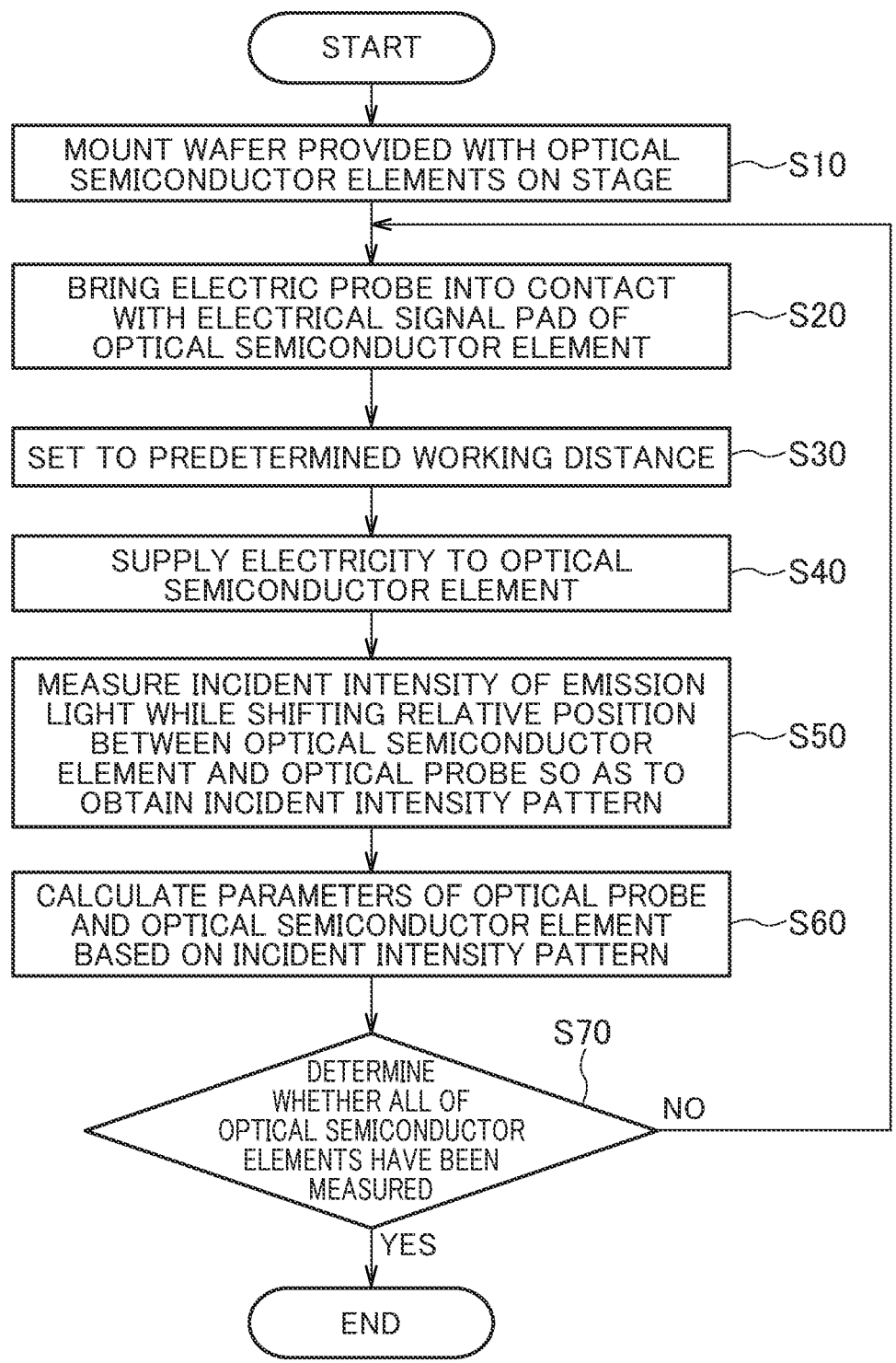
FIG. 10 is a flowchart for explaining a measurement method according to the embodiment of the present invention.

An example of a measurement method by use of the measurement system 1 is described below with reference to the flowchart shown in FIG. 10. The measurement system 1 including the optical probe array and the electric probe array can measure the plural optical semiconductor elements 20 simultaneously or within a short period of time.

In step S10, the wafer 200 provided with the plural optical semiconductor elements 20 is mounted and tightly fixed to a predetermined position on the stage 50 of the measurement system 1.

In step S20, each of the electric probes 30 is brought into contact with the electric signal pad of the optical semiconductor element 20. The position of the central axis C10 of the optical probe 10 at this point is caused to substantially conform to the position of the light-emitting part of the optical semiconductor element 20 in a plan view.

In step S30, the gap between the optical semiconductor element 20 and the incident end surface 100 in the Z-axis direction is set to a predetermined working distance. In particular, the working distance is set such that the incident intensity pattern includes a flat part in which the variation of the peak values of the incident intensities P of the emission light L falls within a predetermined range. For example, the position of the optical probe 10 in the Z-axis direction is adjusted so that the gap between the optical probe 10 and the optical semiconductor element 20 approximates to the working distance WDr.

In step S40, a predetermined current is caused to flow through the electric probe 30 to supply the electricity to the optical semiconductor element 20, so as to lead the optical semiconductor element 20 to emit light. To avoid an influence by a stray light or crosstalk between the optical semiconductor elements 20 emitting light, the electricity may be supplied to the optical semiconductor elements 20 at intervals so as to cause the alternate optical semiconductor elements 20 to emit light. When the predetermined current is caused to flow through the electric probe 30, the respective positions of the optical semiconductor element 20 and the central axis C10 of the optical probe 10 may be readjusted so as to lead the incident intensity to be the maximum value.

In step S50, the relative position between the optical semiconductor element 20 and the optical probe 10 is shifted on the X-Y plane while the working distance in the Z-axis direction is kept constant. The incident intensity of the emission light L is then measured at different positions. For example, the incident intensity P is measured at plural positions within a range of several tens of micrometers in the X-axis direction while the optical probe array is shifted in this range, so as to obtain the incident intensity pattern. The optical probe array may also be shifted in the Y-axis direction in the same manner as in the X-axis direction to measure the incident intensities P at several positions so as to obtain the incident intensity pattern. The supply of the electricity to the optical semiconductor element 20 via the electric probe 30 is then stopped.

In step S60, the average intensity Pa is calculated in accordance with the incident intensity pattern. The average is calculated regarding the incident intensities P included in the range in which the peak values of the emission light L are flat in the incident intensity pattern. For example, the average of the incident intensities P obtained at several positions adjacent to the optical axis C20 is calculated as the average intensity Pa, so as to use the average intensity Pa as the incident intensity of the emission light L. In addition, parameters of the optical probe 10 and the optical semiconductor element 20 are calculated by use of the shape of the incident intensity pattern. Examples of parameters include the output characteristics of the optical semiconductor element 20 with respect to the current, a slope efficiency, and a threshold current value. Further, the effective incident range of the optical probe 10 and the incident range of the emission light L are calculated. Since the incident intensity pattern can be presumed to have an approximately trapezoidal shape, the effective incident radius Se and the incident range radius Sr are calculated at the four positions of the shape of the incident intensity pattern in accordance with the equation (9) and the equation (10). The radiation angle γ is further calculated in accordance with the equation (11), for example.

In step S70, the determination is made as to whether all of the optical semiconductor elements 20 have been measured. The process returns to step S20 when there is any optical semiconductor element 20 not measured yet. The rest of the optical semiconductor elements 20 not supplied with the electricity is caused to emit light, so as to obtain the incident intensity pattern in the same manner as described above. The process ends when the measurement has been completed for all of the optical semiconductor elements 20.

The measurement as described above can obtain the incident intensity pattern of all of the optical semiconductor elements 20 formed on the wafer 200. The use of the optical probe 10 having the curved incident end surface 100 can obtain the incident intensity pattern regarding the emission light L in which the peak values of the incident intensities P are stable and flat.

The incident intensities P obtained by the measurement system 1 may be corrected by use of the correction coefficient K. This can obtain the measurement true value with a high reliability, as in the case of the measurement made by the photodetector such as an optical power meter.

The measurement system 1 can calculate the emission intensity characteristics and the radiation angle γ of the emission light L of the optical semiconductor element 20. The measurement system 1 can also correct the position between the optical probe 10 and the optical semiconductor element 20 in accordance with the shape of the incident intensity pattern when a displacement between the central axis C10 of the optical probe 10 and the optical axis C20 of the optical semiconductor element 20 is large. The measurement of the optical semiconductor element 20 thus can be made in accordance with the accurate positional relationship between the optical probe 10 and the optical semiconductor element 20 after the completion of the positional correction. For example, the current intensity properties (IP) of the optical semiconductor elements 20 are obtained. In addition, the temperature of the stage 50 is regulated after the positional relationship between the optical probe 10 and the optical semiconductor element 20 is corrected, so as to obtain various kinds of data on the temperature characteristics of the optical semiconductor elements 20 mounted on the wafer 200.

The way of supplying the electricity to the optical semiconductor elements 20 may be selected as appropriate from various kinds of methods. For example, the electricity may be supplied sequentially to each of the optical semiconductor elements 20 in order, or may be supplied to the plural optical semiconductor elements 20 simultaneously.

The incident intensity pattern may be obtained such that the optical probe 10 is shifted in both the X-axis direction and the Y-axis direction, or such that the optical probe 10 is shifted in either the X-axis direction or the Y-axis direction.

As described above, the measurement system 1 shifts the relative position between the optical probe 10 and the optical semiconductor element 20 while supplying the electricity to the optical semiconductor element 20 so as to measure the incident intensity P. The measurement system 1 may be configured so as to control the position of the optical probe head 41 and the position of the electric probe head 43 independently of each other.

If the measurement is made without the use of the incident intensity pattern, the measurement accuracy is decreased because of the positional deviation of several micrometers between the optical semiconductor element 20 and the optical probe 10, or because of the characteristics of the variation in the incident intensity pattern of the optical semiconductor element 20 or a distortion or a deformation of the incident end surface 100 of the optical probe 10. The variation in the incident intensities Pin a range of about 0.1 to 0.3 dB is caused regardless of whether the measurement position is appropriate, which leads to a direct influence on the measurement accuracy of the optical semiconductor element 20. In addition, precise processing and inspection at a fine part of the optical fiber are required for the incident end of the optical probe 10 by a grinding process, a spherical-shape processing process, or a discharging process, for example, in order to manufacture the optical probe 10 with less variation. This further requires a shape-distortion measurement for inspecting the precise processing of the optical fiber and a confirmation by a tolerance measurement, requiring a lot of work to make the measurement evaluation accordingly. An intensity distribution, when present in a near field of the optical semiconductor element 20 and if displaced from the optical axis by several micrometers, leads to a decay variation in the incident intensity P. The loss characteristics of the optical probe 10 thus need to be preliminarily confirmed when the true value of the incident intensity P of the optical semiconductor element 20 is obtained.

In contrast, the measurement system 1 can avoid or reduce a cause of output variation upon the measurement of the optical semiconductor elements 20 on the wafer 200, stabilize the output of the emission light L, and improve the measurement reproductivity. The measurement system 1 can also facilitate the manufacture of the optical probes 10, so as to improve the stability and the accuracy of the measured values.

The optical probe 10 having the curved incident end surface 100 is manufactured as follows, for example. First, the incident end surface 100 of the optical probe 10 is processed into a curved surface having a predetermined radius of curvature R. The radius of curvature R is set in a range of about several tens of micrometers to several millimeters, for example. Next, the incident end surface 100 is locally heated to about 1000° C. to 1500° C. so as to be melted and then processed into a smooth curved surface by a convex meniscus. Examples of local heating methods include heating by high-frequency discharge and heating by irradiation with a $CO_2$ laser. The incident end surface 100 may also be processed by local precise grinding or by mechanical processing such as polishing.

The measurement made by the measurement system 1 optimizes the working distance WD between the optical semiconductor element 20 and the incident end surface 100 of the optical probe 10, so as to stabilize the incident intensity pattern and reduce the variation in the incident intensities caused by a positional displacement. The measurement system 1 also measures the incident intensities P while shifting the optical probe 10 slightly in a range of about ±several tens of micrometers on the X-Y plane upon the measurement of the optical semiconductor element 20. The average of the peak values of the incident intensities P in the incident intensity pattern thus obtained is calculated, so as to stabilize the measured value. This can improve and stabilize the measurement accuracy of the incident intensity P. Calculating the average of the peak values of the incident intensities P can reduce the variation of the incident intensities P derived from a positional displacement between the optical probe 10 and the optical semiconductor element 20, so as to improve the reliability due to the stabilization and the reproductivity of the measured value.

The measurement made by the measurement system 1 also obtains the incident intensity pattern while shifting the optical probe 10 in the X-axis direction or the Y-axis direction at the predetermined working distance with respect to the optical semiconductor element 20 having a large aperture size. The measurement system 1 then calculates the incident energy density of the emission light L entering the optical probe 10 in accordance with the incident intensity pattern. The measurement system 1 also measures and calculates the radiation angle γ of the optical semiconductor element 20 by use of the incident intensity pattern.

The measurement system 1 includes the electric probes 30 and the photoelectric converter 47 in order to measure the incident intensities of the optical semiconductor elements 20 formed in the wafer state. The measurement system 1 can measure the output values of the optical semiconductor elements 20 measured by the optical probes 10.

As described above, the measurement system 1 according to the embodiment can facilitate the manufacture of the optical probes 10, and stably measure the optical semiconductor elements 20 having a predetermined size. The measurement system 1 is a multi-channel optical/electric probe card measurement system using the multi-core optical probe array of m×n (m, n≥2) including the optical probes 10, and the electric probe array including the electric probes 30 with the same number as or the multiple number of the optical probes 10. The measurement system 1 can stably measure the incident intensities P and the radiation angles γ of the plural optical semiconductor elements 20 simultaneously. This can simplify the measurement and reduce the measurement time of the plural optical semiconductor elements 20 formed on the wafer 200. The measurement system 1 obtains the correction coefficient K of the respective optical probes 10, so as to compare the incident intensity true value P0 with the incident intensity P obtained by the measurement of the optical probe 10, and determine the quality in the wafer state with respect to the required specifications of the optical semiconductor elements 20 by use of the measurement results thus obtained. The measurement system 1 thus contributes to improving the yield of the optical semiconductor elements 20. The embodiment as described above can provide the measurement system 1 that can simplify the process of manufacturing the optical probes 10 and improve the reproductivity of accuracy and the reliability of the measured values.

Modified Example

Figure 11:
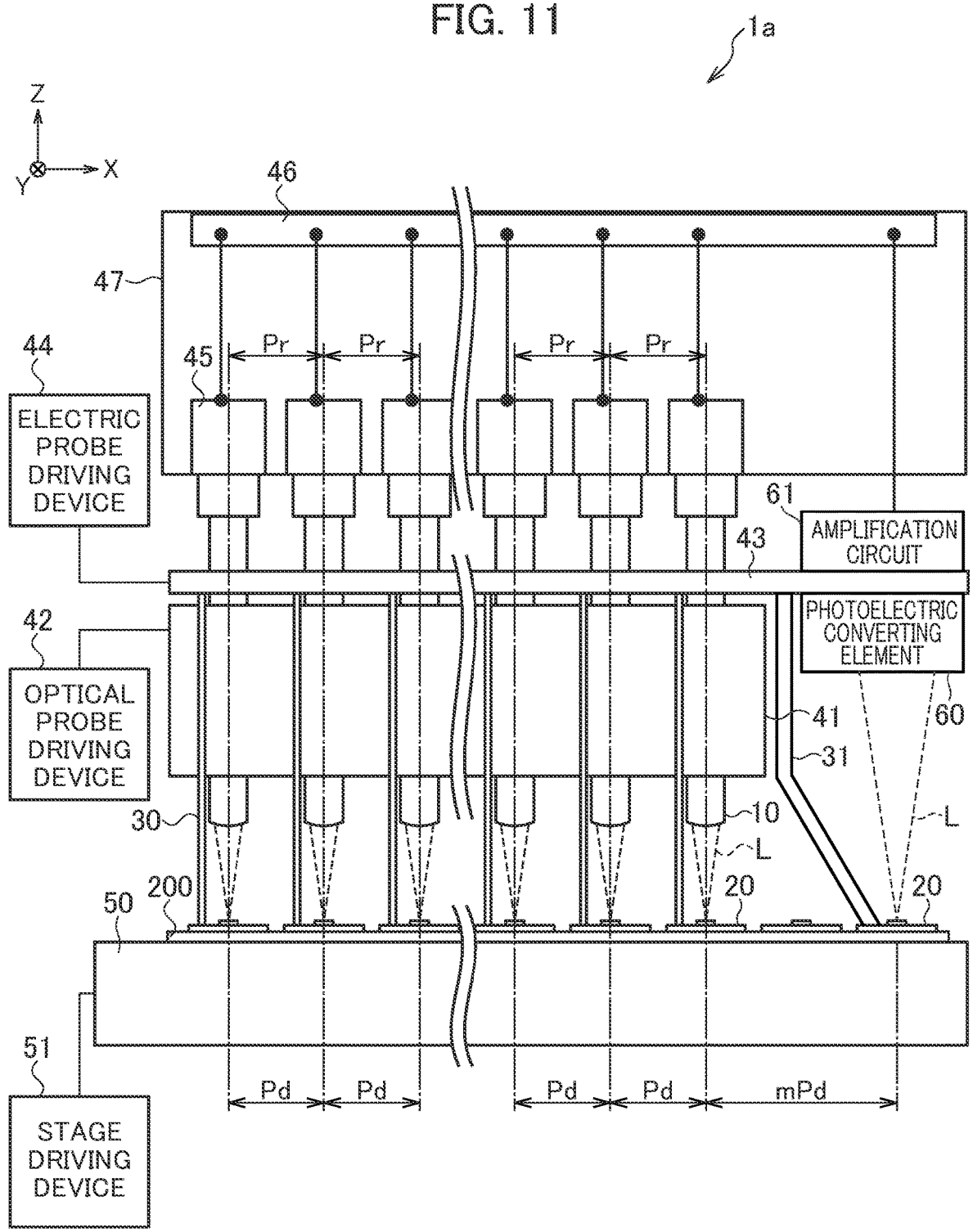
FIG. 11 is a schematic view illustrating a configuration of a measurement system according to a modified example of the embodiment of the present invention.

A measurement system 1a according to a modified example illustrated in FIG. 11 differs from the measurement system 1 illustrated in FIG. 9 in further including a photoelectric converting element 60 arranged at a position separated by a predetermined distance from the optical probe 10. The photoelectric converting element 60 in the measurement system 1a is separated by a distance mPd from the closest optical probe 10. The distance mPd is set to a distance that can avoid an influence by a stray light or crosstalk of the emission lights L emitted from the optical semiconductor elements 20 adjacent to each other, for example.

The photoelectric converting element 60 as used herein is a photoelectric converting element, such as a silicon photodetector, having linearity in the conversion characteristics that are stable. The photoelectric converting element 60 has a size that fulfills predetermined conditions. For example, the photoelectric converting element 60 has a size that can directly receive the emission light L of the optical semiconductor element 20. The size of the photoelectric converting element 60 is set to about 0.5 to several millimeters square, for example, depending on the spot size of the incident light. Alternatively, the plural photoelectric converting elements 60 may be used to be arranged in array so as to improve the efficiency of the measurement.

The photoelectric converting element 60 is arranged together with an amplification circuit 61 at a position separated to some extent from the optical probe 10. The amplification circuit 61 amplifies and stabilizes an electrical signal output from the photoelectric converting element 60. The measurement system 1a including the photoelectric converting element 60 measures the emission light L from the optical semiconductor element 20 at a predetermined current value before measuring the optical semiconductor element 20 by the optical probe 10. The supply of the electricity to the optical semiconductor element 20 is made such that a current is applied from an electric probe 31 of cantilever type, for example. The photoelectric converting element 60 first applies the predetermined current value to the n-number of the optical semiconductor elements 20 on the wafer 200, and measures and stores the incident intensity true values P0 of the emission lights L while moving the stage 50. To use the incident intensities of the emission lights L measured by the photoelectric converting element 60 as the incident intensity true values P0, the photoelectric converting element 60 may be preliminarily calibrated.

The measurement made by the measurement system 1a leads the photoelectric converting element 60 to measure the incident intensity true values P0 at the predetermined current value regarding the n-number of the optical semiconductor elements 20 arranged on the wafer 200. The measurement system 1a then supplies the electricity to the same optical semiconductor elements 20 at the same current value as the measurement made by the photoelectric converting element 60 while shifting the optical probes 10 in the X-axis direction or the Y-axis direction, so as to measure the incident intensities P of the emission lights L. The measurement system 1a compares the incident intensity true value P0 obtained by the photoelectric converting element 60 with the incident intensity P1 obtained by the optical probe 10, so as to obtain the correction coefficient K for each of the n-number of the optical probes 10. The correction coefficient K is obtained by K=P0/P1. In addition, measuring the current values at two or more positions on the optical axis of each optical probe 10 can measure the IL characteristics, the slope efficiency, and the threshold current value of the optical semiconductor element 20, for example.

As described above, the measurement system 1a can eliminate the step of obtaining the correction coefficient K for the respective optical probes 10 made before the manufacture of the measurement system 1a, and obtain the correction coefficient K after the manufacture of the measurement system 1a. This can save much time and work to inspect the optical probes 10 during the manufacture of the measurement system 1a.

The measurement system 1a regularly repeatedly measures the correction coefficient K for the respective optical probes 10 after the use of the optical probes 10 for a predetermined period of time, for example, so as to calibrate the measurement system 1a. The measurement system 1a thus can keep making the accurate measurement, so as to improve the reliability of the measured values.

Other Embodiments

As above, the present invention has been described by the embodiments; however, it should not be understood that the description and the drawings, which form a part of this disclosure, limit the present invention. For those skilled in the art, varieties of alternative embodiments, examples and application technologies will be obvious from this disclosure.

For example, the above embodiment has been illustrated with the case in which the optical probe array and the electric probe array are configured to be movable independently of each other, and the optical probes 10 are shifted while the positions of the optical semiconductor elements 20 are fixed when the relative position between the respective optical probes 10 and the respective optical semiconductor elements 20 is displaced. Alternatively, the electric probes 30 and the optical semiconductor elements 20 may be shifted while the positions of the optical probes 10 are fixed. The method of shifting the relative position between respective optical probes 10 and the respective optical semiconductor elements 20 may be determined as appropriate, and any methods may be included in the embodiment according to the present invention.

While the above embodiment has been illustrated with the case in which the optical probe 10 has an optical fiber structure, the optical probe 10 is not limited to the optical fiber structure. For example, the optical probe 10, when having an optical waveguide structure, may have a rectangular shape in cross section, or may have an array structure or a structure in which a lens is attached at the tip of the optical probe 10.

Further, the optical probe 10 and the electric probe 30 may be integrated together. The electric probe 30 in this case may have a cantilever structure having flexibility. The stage 50 is then moved while the connection between the electrical signal pad of the optical semiconductor element 20 and the electric probe 30 is kept due to the flexibility of the electric probe 30, so as to change the relative position between the optical probe 10 and the optical semiconductor element 20 and measure the optical semiconductor elements 20.

As described above, it is natural that the present invention incorporates a variety of embodiments which are not described herein.

What is claimed is:

1. A measurement method of receiving, on an incident end surface of an optical probe, an emission light output from an optical semiconductor element, the method comprising:
    setting a gap between the optical semiconductor element and the incident end surface to a predetermined working distance;
    shifting a relative position between the optical semiconductor element and the optical probe on a plane surface intersecting with and perpendicular to an optical axis of the emission light to measure an incident intensity of the emission light at a plurality of different shifted positions, resulting in a plurality of measured incident intensities corresponding to the plurality of different shifted positions, wherein the shifting is performed while keeping the predetermined working distance constant; and
    obtaining an incident intensity pattern from the plurality of measured incident intensities, the incident intensity pattern showing a relationship between a change in the relative position and the respective plurality of measured incident intensities.

2. The measurement method according to claim 1, wherein the working distance is set such that the incident intensity pattern includes a flat part in which a variation of peak values of the plurality of measured incident intensities falls in a predetermined range.

3. The measurement method according to claim 2, further comprising calculating an average of the plurality of measured incident intensities included in the flat part.

4. The measurement method according to claim 3, wherein the average of the plurality of measured incident intensities adjacent to the optical axis of the emission light is calculated.

5. The measurement method according to claim 1, further comprising calculating a radiation angle of the emission light in accordance with the incident intensity pattern.

6. The measurement method according to claim 1, further comprising calculating an incident range of the emission light on the incident end surface and an effective incident range of the emission light that is transmitted only through a core part of the optical probe in accordance with the incident intensity pattern.

7. The measurement method according to claim 1, wherein the plurality of measured incident intensities are measured by use of the optical probe in which the incident end surface is curved.

8. The measurement method according to claim 1, further comprising calculating a radiation angle γ of the emission light of the optical semiconductor element including a light-emitting part having a side with a length of a in a shifting direction in which the relative position is shifted, and a side with a length of b in a direction intersecting with the shifting direction in accordance with the following equation:

$$\gamma = 2 \times \tan^{-1}\{[Dm-(a+2Se)]/2WD\}$$

where $2Se$ is an effective incident range of the emission light that is transmitted only through a core part of the optical probe, WD is the working distance, and Dm is a shifted distance in which the plurality of measured incident intensities are greater than zero in the incident intensity pattern.

9. The measurement method according to claim 8, further comprising calculating an incident energy density Ed of the emission light and an area Sw of an incident range of the emission light on the incident end surface in accordance with the following equations:

$$Ed = Pa/(\pi \times Se)^2$$

$$Sw = [a+2WD \times \tan(\gamma/2)] \times [b+2WD \times \tan(\gamma/2)]$$

where Pa is an average intensity of the plurality of measured incident intensities at peak values in the incident intensity pattern.

10. The measurement method according to claim 1, further comprising correcting the respective plurality of measured incident intensities by use of an incident intensity true value of the emission light directly measured by a photodetector.

11. A measurement system for measuring an emission light output from an optical semiconductor element, the system comprising:
    an optical probe configured to receive the emission light on an incident end surface;
    an optical probe head configured to hold the optical probe and to set a gap between the optical semiconductor element and the incident end surface to a predetermined working distance; and
    a driving device configured to move at least either the optical probe head or the optical semiconductor element,
    the driving device shifting a relative position between the optical semiconductor element and the optical probe on a plane surface intersecting with and perpendicular to an optical axis of the emission light,
    the measurement system being configured to measure an incident intensity of the emission light at a plurality of different shifted positions, resulting in a plurality of measured incident intensities corresponding to the plurality of different shifted positions, wherein the shifting is performed while keeping the predetermined working distance constant, and the measurement system being configured to obtain an incident intensity pattern from the plurality of measured incident intensities, the incident intensity pattern showing a relationship between a change in the relative position and the respective plurality of measured incident intensities.

12. The measurement system according to claim 11, further comprising an electric probe configured to send an electrical signal to the optical semiconductor element,
    the measurement system being configured to shift the relative position while causing the electric probe to supply an electricity to the optical semiconductor element.

13. The measurement system according to claim 11, wherein the incident end surface of the optical probe is a curved surface.

14. The measurement system according to claim 11, wherein the optical probe includes a core part and a clad part arranged along an outer circumference of the core part,
wherein a working distance WD, a radius of curvature R of the incident end surface, a radiation angle $\gamma$ of the emission light, an effective incident radius Se of the emission light on the incident end surface transmitted to the core part without passing through the clad part, an incident range radius Sr of the emission light on the incident end surface, a refractive index nr of the core part at an incident position of the emission light, a numerical aperture NA0 when the incident end surface is flat, a refracting angle $\beta$ of the emission light in the core part, and a central radius $\omega$ at the incident position of the emission light, fulfill the following equations:

$Se = R \times \sin(\omega)$ $Sr = WD \times \tan(\gamma/2)$ $\omega = \pm \sin^{-1}[B^2/(A^2+B^2)]^{1/2}$ $\beta = \sin^{-1}\{\sin[\sin^{-1}(NA0)/nr]\}$ where A is given by $A = nr \times \cos(\beta) - \cos(\gamma/2)$, and B is given by $B = nr \times \sin(\beta) - \sin(\gamma/2)$.

15. The measurement system according to claim 11, further comprising a photoelectric converting element configured to directly receive the emission light and photoelectrically convert the emission light to an electrical signal.

* * * * *